No. 791,037. PATENTED MAY 30, 1905.
P. LE SUEUR.
LUBRICATING DEVICE FOR VEHICLE AXLES.
APPLICATION FILED AUG. 5, 1904.
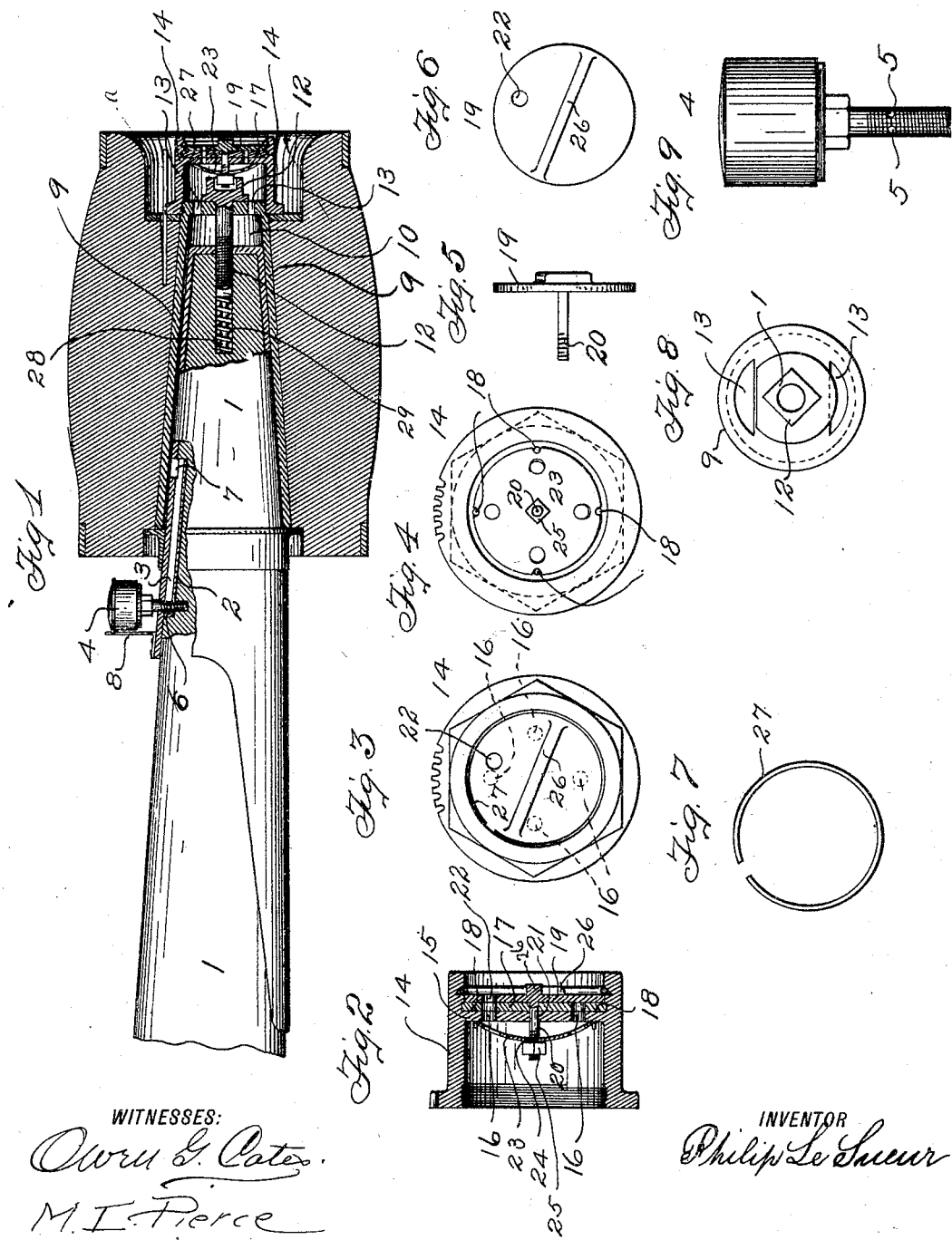
WITNESSES:
INVENTOR
Philip Le Sueur No. 791,037.                                     Patented May 30, 1905.

UNITED STATES PATENT OFFICE.

PHILIP LE SUEUR, OF CALABASAS, CALIFORNIA.

LUBRICATING DEVICE FOR VEHICLE-AXLES.

SPECIFICATION forming part of Letters Patent No. 791,037, dated May 30, 1905.

Application filed August 5, 1904. Serial No. 219,629.

*To all whom it may concern:*

Be it known that I, PHILIP LE SUEUR, a citizen of the United States, residing at Calabasas, in the county of Los Angeles and State of California, have invented a new and useful Lubricating Device for Vehicle-Axles, of which the following is a specification.

This invention relates to a new and useful construction of a vehicle-axle which is particularly adapted to the funnel-shaped thimble-skein type of axle; and the main object of the invention is to provide a lubricating device whereby solid lubricant may be applied to the portion of the axle that receives the most wear and the heaviest traction and which in practice invariably runs dry long before the other portion of the axle.

Another object is to provide a device of the character described which will allow the insertion of solid lubricant without removing any bolts or nuts and without removing the wheel from the axle and without requiring the use of a wrench or other tool.

Another object of the invention is to provide means for supplying lubricant under pressure directly to the inner portions of both the outer bearing-face of the axle and to the inner bearing-face of the axle-box—that is to say, to supply the lubricant from a duct the mouth of which opens directly at the crack or slight annular space which is between the bearing-face of the axle and the inner bearing-face of the axle-box.

Where the axle is provided with a longitudinal groove into which lubricant is fed, the large space causes the lubricant to spread out as soon as it feeds thereinto, which reduces the pressure on the lubricant, and it very quickly works up the conical axle toward the shoulder and is squeezed out both by the pressure of the axle against the axle-box, due to the weight of the wagon, and also by the chucking of the wheels, and in this connection the point aimed at in this invention is to obviate this nullification of pressure and to prevent such excessive loss of the lubricant.

Other objects and advantages of the invention will appear from the following description.

The accompanying drawings illustrate the invention, and referring thereto, Figure 1 is a longitudinal section through the device, partly in section. Fig. 2 is a section through the hollow nut. Fig. 3 is a view of the outer face of the hollow nut, the retaining devices being in a position shutting off the outward escape of oil. Fig. 4 is a view of the reverse side of the nut shown in Fig. 3. Fig. 5 is a side elevation of the retaining-plate, showing its standard. Fig. 6 is a face view of the retaining-plate. Fig. 7 is a detail of the circular spring. Fig. 8 is an end view of the semi-blind journal-box with bolt in position, showing a portion of the bolt-flange removed. Fig. 9 is a detail side elevation of the lubricant-cup.

1 designates the axle, having a hole or groove 2 therein, in which lies a lubricant-conducting tube 3.

4 is a pressure-cup the tubular shank of which has a hole 5 in one side thereof, the shank being screwed into a threaded hole 6 in the end of the lubricant-conducting tube 3 and into the axle below the hole 5, registering with the conducting-tube 3.

7 is an outlet-duct for the lubricant-conducting tube. This outlet-duct lies flush with the outer bearing-face of the axle, and its discharge-orifice is substantially equal to the cross-sectional area of the lubricant-tube 3. The mouth of this duct is thus adapted to discharge lubricant directly against the inner face of the axle-box, and as the bearing-face of the axle is a conical member having a smooth unbroken bearing-face, except for the duct described, the lubricant is held in compact form and its pressure is maintained, and the lubricant is concentrated at a point where it will be discharged, so as to most effectually lubricate the inner end of the axle-box and axle, as it is at this point that the axle most frequently runs dry, this point being the hardest place at which to maintain a sufficient abundance of lubricant, owing to the rapid escape of lubricant at the shoulder, due to the working of the lubricant up the axle and its being squeezed out at the shoulder.

A spring-finger 8 prevents the loss of the pressure-cup cap. The pressure-cup 4 is loaded with lubricant and the cap screwed on.

Pressure from the cap forces the lubricant through the tube 3 to the outlet-duct 7, and from thence the lubricant is fed at the desired rate to the proper point without requiring the use of an excessive amount of lubricant, which if not confined to one point by the small duct would spread over an undue amount of surface of the axle and its effectiveness at the critical place would be greatly diminished. To this end the outer duct is situated a short distance inside the axle-box. The thimble-skein axle of commerce is very loosely fitted to the axle-box, and as the weight of the wagon causes the axle to rest on the bottom of the axle-box there is always a space between the top of the axle and the top of the box, which space freely allows of grease being forced out from the duct and gives sufficient room for it to spread from the duct and lubricate the inner end of the axle-journal. If the duct were situated at the lower or outer end of the axle-journal, the grease upon issuing from the duct would quickly work up along the axle-journal from the shoulder or inner end of the axle-journal, and by the time it had reached the inner end of the axle-journal it would be so warm and so worn and so fluid that its lubricating qualities would be of little effect at the inner end of the axle-journal. Hence this concentration of discharge of lubricant at the inner end of the axle-journal is a most important feature.

The axle 1 at its outer end is drilled and tapped, as shown. The outer end of the axle-box 9 has cast thereon a retaining-wall $a$, which is centrally drilled. The axle 1 terminates short of the end of the axle-box, thereby producing a chamber 10, which forms a receptacle for lubricant.

12 is a retaining-bolt having an elongated smooth shank which enters the central hole of the semiblind axle-box, the long smooth shank traversing the oil-chamber 10, the threaded portion of the bolt screwing into the tapped hole in the axle end. On each side of the central hole in the end of the semiblind journal-box is a passage-way 13 for lubricant. The retaining-bolt 12 has a portion of its flange cut away to allow free passage of lubricant from the hollow nut 14 to the inner lubricant-chamber 10. The hollow nut 14, which screws onto the outer end of the axle-box 9, is cupped on both faces, forming a central web 15, which in this embodiment is provided with four holes 16, and a leather washer 17 is nested within the outer cupped portion of the nut 14 and lies closely against the web 15. The leather washer 17 is rendered non-turnable by pins 18, and in addition the walls of the nut are undercut slightly, so as to secure the washer 17. The washer 17 also has four holes, which register with four holes in the central web.

19 is a metal plate, from the center of which projects a standard 20, threaded at its end. The standard 20 passes through a central hole 21 in the web 15, and the plate 19 lies close to the leather washer 17 and is provided with an oil-hole 22.

23 is a concavo-convex spring-washer which bears against the inside of the web 15, being secured by a nut 25, screwed onto the standard 20. By this means a spring-pressure is exerted on the outside plate 19, causing it to resiliently bear firmly against the leather washer 17. The four holes in the spring-washer 23 are held in register with the holes in the central web 15 by means of pins 18.

When it is desired to supply lubricant to the axle, the plate 19 may be turned by means of a cross-bar or boss 26, and its oil-hole 22 may thus be brought to register with the uppermost hole 16 in the web 15, which allows of the insertion of lubricant therethrough. To close the lubricant-chamber, the plate 19 is turned so that its oil-hole 22 is over one of the blank parts of the leather washer.

A special feature of the invention is the means for holding the edge of the oil-retaining plate in close contact with the face of the hollow nut. The circular spring 27 is sprung into undercut walls of the hollow nut and exercises a continuous resilient pressure, which has the advantage of never getting slack and absolutely prevents escape of lubricant.

Introduced between the end of the retaining-bolt 12 and the bottom of the hole in the axle end is a bolt-stop 28, having a concave head which fits the concave end of the retaining-bolt 12 and forms a positive mechanical stop to position the bolt 12 when screwed home. A coil-spring 29 encircles the shank of the bolt-stop 28 and causes the latter to press against the head of the retaining-bolt 12, thus forcing the screw-threads of the retaining-bolt tightly into engagement with the threads in the axle, thus holding the retaining-bolt from turning accidentally or getting loose from the jar of the wagon.

While I have shown and described the preferred embodiment of my invention, it should be understood that various changes and modifications may be made therein without departing from the scope of the claims.

What I claim is—

1. In a lubricating device for vehicle-axles, an axle, a semiblind axle-box thereon, a hub on the axle-box, there being a space between the retaining-wall at the end of the semiblind axle-box and the end of the axle forming a lubricant-chamber, said retaining-wall having passages for lubricant, a retaining-bolt having a portion of its flange removed, the shank of the bolt passing through the retaining-wall into the axle, a hollow nut screwed to the axle-box and having a perforated web, a perforated pressure-plate lying adjacent the outer face of the web, and means on the opposite side of the web connecting with the pressure-plate for forcing the pressure-plate toward the web.

2. In a lubricating device for vehicle-axles, an axle, a semiblind axle-box thereon, a hub on the axle-box, there being a space between the retaining-wall of the axle-box and the end of the axle forming a lubricant-chamber, said retaining-wall having passages for lubricant, and a flanged retaining-bolt, with a portion of the flange removed, passing through the retaining-wall and rigidly engaging with the axle, a hollow nut screwed to the semiblind axle-box and having a perforated web, a perforated plate of suitable packing material nested against and registering with said perforated plate of a hollow nut, and a perforated pressure-plate lying against the outer face of the packing, a standard carried by the plate and projecting through the packing and web, and means on the inner side of the web coacting with the standard for holding the plate in frictional contact with the packing.

3. In a lubricating device for vehicle-axles, an axle, a semiblind axle-box thereon, a hub on the axle-box, a headed retainer having an elongated, shank passing through a central hole in the end of the semiblind axle-box and traversing the oil-chamber and rigidly engaging with the axle end, a hollow nut screwed to the end of the semiblind axle-box, perforated plates in said nut, each plate having a centrally-drilled hole, a pressure-plate having an oil-hole and a standard projecting from the pressure-plate, through the perforated plates, and means engaging the standard for holding the pressure-plate in position.

4. In a lubricating device for vehicle-axles, an axle, a semiblind axle-box retained thereon, a hollow nut screwed to the semiblind axle-box, perforated plates in said nut, a pressure-plate having an oil-hole, a standard on the pressure-plate and threaded at its end, projecting through a central hole in the hollow nut, a spring-washer on the threaded end of said standard and having perforations which register with perforations in the hollow nut, and a circular spring engaging the walls of the hollow nut and resiliently bearing against the pressure-plate.

5. In a lubricating device for vehicle-axles, the combination of an axle, a semiblind axle-box thereon, a hub on the axle-box, there being a space between the end of the semiblind axle-box and the end of the axle forming a lubricant-chamber, said semiblind axle-box having lubricant passage-ways, a hollow nut screwed to the axle-box, said hollow nut having a recess provided with undercut walls in its outer face, a central web in the nut provided with one or more lubricant passage-ways, an oil-retaining plate having an oil-hole, and a circular spring engaging the undercut walls of said recess.

6. In a lubricating device for vehicle-axles, the combination of an axle, an axle-box thereon, a hub on the axle-box, the outer end of the axle-box having a retaining-wall, there being a space between the retaining-wall and the end of the axle forming a lubricant-chamber, said retaining-wall having one or more passages for lubricant, a hollow nut screwed to said axle-box, said hollow nut having a recess in its outside face provided with undercut walls, a central web in the nut provided with one or more lubricant-passages, an oil-retaining plate, a circular spring engaging the undercut walls of said recess and having frictional contact with the outer periphery of the oil-retaining plate, and slidable means for closing the orifice for the introduction of lubricant.

In testimony whereof I have hereunto signed my name, in the presence of two subscribing witnesses, at Los Angeles, in the county of Los Angeles and State of California, this 30th day of July, 1904.

PHILIP LE SUEUR.

Witnesses:
L. J. JACOBSON,
L. E. VAUGHN.